Dec. 15, 1931. C. BALOUGH 1,836,949
BOLT FOR CONNECTING RODS AND THE LIKE
Filed May 2, 1929

Inventor
Charles Balough
By Harry Frease, Attorney

Patented Dec. 15, 1931

1,836,949

UNITED STATES PATENT OFFICE

CHARLES BALOUGH, OF CANTON, OHIO, ASSIGNOR TO HERCULES MOTORS CORPORATION, OF CANTON, OHIO, A CORPORATION OF OHIO

BOLT FOR CONNECTING RODS AND THE LIKE

Application filed May 2, 1929. Serial No. 359,861.

My invention relates to bolts for use in joining two or more members together, such as the component members of a connecting rod, each bolt being provided with means for abutment against one of the members being joined, for preventing turning of the bolt, so that a nut may be screwed thereon by use of a single wrench.

A common form of bolt for this purpose includes a partially cylindric head concentric with the bolt shank, one side of the head having a flat surface formed thereon.

The flat surface of such a bolt must abut against a flat surface on the member to be joined, and this requirement frequently results in a weakening of the member to be joined.

Moreover, the flat surface of such a bolt is not adapted for fitting against an arcuate surface on the member to be joined, nor is it adapted to fit in a counterbored cylindric cavity.

The objects of the present improvements include the provision of a bolt having an improved head which may fit against either a flat or an arcuate surface of a member to be joined, or in a cylindric counterbored cavity therein, for preventing turning of the bolt when the nut is screwed thereon.

These objects are attained in the present invention, as will be hereinafter set forth in detail and claimed.

Figure 2:
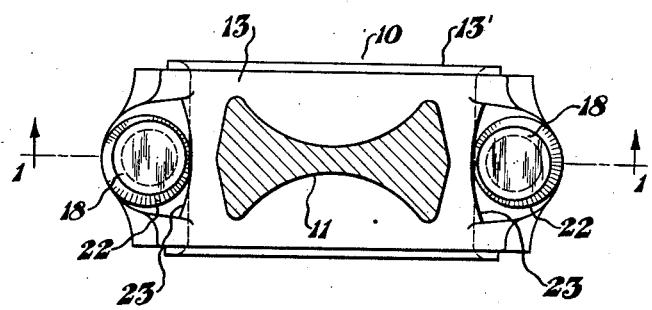
Figure 1:
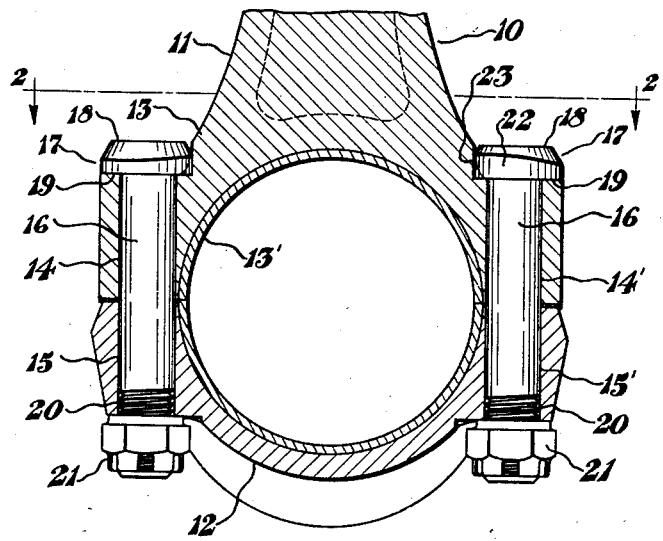
Figure 3:
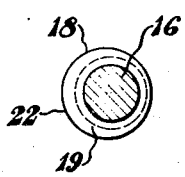
Figure 4:
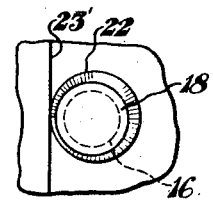
Figure 5:
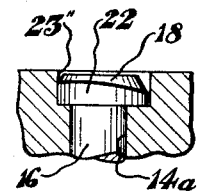

A preferred embodiment of the improvements is illustrated in the accompanying drawings, forming part hereof, in which Figure 1 is a longitudinal fragmentary sectional view as on line 1—1, Fig. 2, of a connecting rod whose members are joined together by a plurality of the improved bolts of the present invention, the improved head of each bolt abutting against an arcuate surface on one of the connecting rod members;

Fig. 2 a transverse sectional view thereof as on line 2—2, Fig. 1;

Fig. 3 a detached transverse sectional view through the shank of one of the improved bolts looking toward the head thereof;

Fig. 4 a fragmentary view similar to Fig. 2, illustrating one of the improved bolts with its head abutting against a flat surface on a member to be joined; and Fig. 5 a fragmentary view similar to Fig. 1, illustrating one of the improved bolts with its head abutting against the side surface of a counterbore in a member to be joined.

Similar numerals refer to similar parts throughout the several views.

The connecting rod indicated generally at 10 includes a blade 11 and a cap 12. The enlarged crank end 13 of the blade is provided with one or more bolt shank receiving cylindric bores 14 in one side, and with one or more bolt shank receiving cylindric bores 14′ in the other side; and the bores 14 and 14′ register with similar bores 15 and 15′ in the sides of the cap 12.

A cylindric shank 16 of one of the improved bolts 17 of the present invention extends through and fits each set of registering cylindric bores, from the blade to the cap.

Each bolt 17 in addition to the shank 16 includes an improved eccentric head 18 whose annular face 19 about the shank abuts around its entire periphery against a suitable seat face formed on the crank end of the blade.

By providing for abutment around its entire periphery of the annular face 19 of the head 18 with the seat face on the crank end of the blade, eccentric loading on the bolt is prevented, and uniform resistance to shear is effected around the entire periphery of the head.

Each bolt shank 16 extends through the registering bores beyond the outer end of the cap, and each shank, in the usual manner, is provided with threads 20 at its outer end, upon which a nut 21 may be screwed for clamping and securing the cap and the blade together.

Opposite complementary semi-cylindric inner surfaces of the cap and blade form a cylindric seat for the connecting rod bearing material 13′ in the usual manner.

The elements of the cylindric side surface 22 of each eccentric head are parallel with the elements of the cylindric surface of each shank 16.

The cylindric side surface 22 of each eccentric head 18, being eccentric with the cylindric surface of each shank 16, when the nut 21 is screwed on the bolt shank end, the shank tends to turn; and the eccentric side surface 22 of the cylindric head abuts substantially tangentially against the adjacent side surface 23 formed on one of the members being joined.

In the illustrated example in Figs. 1, 2 and 3, the side surface 23 on the member being joined is an arcuate surface on the blade 11, and the abutment of the cylindric side surface 22 of the bolt head against the arcuate surface 23 prevents turning the bolt head, and thus permits tightening of the nut by the use of only a single wrench.

In Fig. 4 the eccentric cylindric side surface 22 of one of the improved bolts is illustrated in abutment against the flat surface 23' on a member to be joined; and in Fig. 5 the cylindric side surface 22 of the eccentric head of another of the improved bolts abuts against the cylindric side surface 23" of a counterbore eccentric with a bore 14a for the bolt shank 16.

I claim:

1. In combination, separable members, and a bolt for clamping together the separable members, the members having formed therein registering cylindric bores, one of the members having formed thereon a seat face around the outer end of its bore and having a surface formed thereon angular to the seat face and spaced from the bore, the bolt including a cylindric shank, an eccentric head at one end of the shank, and threads on the other end of the shank, and the bolt head having an annular clamping surface extending angularly from and entirely around the shank, the bolt shank extending through and fitting the registering bores, and the annular clamping surface of the bolt head abutting against the seat face, and the bolt head having a surface angular to its clamping surface and abutting against the angular surface of the member, and the threaded end of the shank extending beyond the outer surface of the other separable member, and a nut screwed on the threaded shank end against the outer surface of the other member.

2. In combination, two separable members, a bolt for clamping the members together, one of the members having an enlarged end, the enlarged end having a cylindric bore formed therein, the other member having a cylindric bore formed therein and registering with the enlarged end bore, the enlarged end having formed thereon a seat face around the outer end of its bore and having a surface formed thereon angular to the seat face and spaced from the bore, the bolt including a cylindric shank, an eccentric head at one end of the shank, and threads on the other end of the shank, and the bolt head having an annular clamping surface extending angularly from and entirely around the shank, the bolt shank extending through and fitting the registering bores, and the annular clamping surface of the bolt head abutting against the seat face of the enlarged end, and the bolt head having a surface angular to its clamping surface and abutting against the annular surface of the enlarged end, and the threaded end of the shank extending beyond the outer surface of the other member, and a nut screwed on the threaded shank end and against the outer surface of the other member.

In testimony that I claim the above, I have hereunto subscribed my name.

CHARLES BALOUGH.